United States Patent
Mori

[11] Patent Number: 5,180,026
[45] Date of Patent: Jan. 19, 1993

[54] REAR WHEEL STEERING ANGLE CONTROL SYSTEM FOR VEHICLE

[75] Inventor: Kazunori Mori, Kanagawa, Japan

[73] Assignee: Nissan Motor Company, Limited, Yokohama, Japan

[21] Appl. No.: 758,454

[22] Filed: Sep. 6, 1991

Related U.S. Application Data

[63] Continuation of Ser. No. 483,046, Feb. 21, 1990, abandoned.

[30] Foreign Application Priority Data

Feb. 21, 1989 [JP] Japan ................. 1-39251

[51] Int. Cl.[5] ................ B60G 17/015; B62D 5/06
[52] U.S. Cl. ............................ 180/140; 180/142; 280/91; 280/707; 364/424.05
[58] Field of Search .......... 180/140, 142; 280/91, 280/707, 771, 773; 364/424.05

[56] References Cited

U.S. PATENT DOCUMENTS

| | | | |
|---|---|---|---|
| 4,673,189 | 6/1987 | Kanazawa et al. | 280/91 |
| 4,706,771 | 11/1987 | Kawabe et al. | 180/140 X |
| 4,718,685 | 1/1988 | Kawabe et al. | 180/140 X |
| 4,786,066 | 11/1988 | Kondo et al. | 280/91 |
| 4,787,645 | 11/1988 | Ohbayashi et al. | 280/91 |
| 4,840,389 | 6/1989 | Kawabe et al. | 180/140 X |

FOREIGN PATENT DOCUMENTS

| | | |
|---|---|---|
| 0289039 | 11/1988 | European Pat. Off. |
| 3722086 | 1/1988 | Fed. Rep. of Germany |
| 3803037 | 8/1988 | Fed. Rep. of Germany |

Primary Examiner—Mitchell J. Hill
Attorney, Agent, or Firm—Foley & Lardner

[57] ABSTRACT

A system for controlling the steering angle for the rear wheels of a vehicle is provided. This system includes an angle sensor for sensing a steered angle, a vehicle speed sensor, and a steering angle controller. The steering angle controller is adapted for controlling steering of the rear wheels based on a target steering angle derived according to a transfer function in view of suspension steering to improve yaw damping in ranges of high steering frequency.

9 Claims, 6 Drawing Sheets

REAR WHEEL STEERING ANGLE CONTROL SYSTEM FOR VEHICLE

This application is a continuation, of application Ser. No. 07/483,046, filed Feb. 21, 1990, now abandoned.

BACKGROUND OF THE INVENTION

1. Technical Field

The present invention relates generally to a system for controlling the steering angle of the rear wheels of a vehicle. More particularly, the invention relates to a system for controlling the steering angle of the rear wheels in view of a parameter with respect to suspension steer.

2. Background Art

In an automotive vehicle without rear wheel steering (2WS), yaw rate gain and phase lag corresponding to the steering frequency f of the steering wheel tend to be quite low and to become greater as the steering frequency increases. Four wheel steering (4WS) vehicles have accordingly been developed. A system for steering the rear wheels of such a 4WS vehicle is adapted for controlling the central yaw position using the two-degrees-of-freedom model in view only of yawing and lateral displacement of the vehicle. Thus, based on a control transfer function for steering the rear wheels expressed theoretically by one linear expression over another linear expression (i.e. X/x), a target rear wheel steering angle is determined.

It will be appreciated that the prior art system does not take account of variations in attitude during running such as roll and compliance steering or suspension steer caused by lateral forces acting on a wheel when a slip angle is produced on the wheel. As a result, due to roll steering (the influence of compliance steering is relatively small), the value of the rear wheel steering angle does not increase, causing variation in yaw rate and phase lag to increase. This results in only a small improvement in yaw damping from the rear wheel steering.

It is a desired characteristic that the value of the steering angle increase as the steering frequency becomes higher.

SUMMARY OF THE INVENTION

It is accordingly an object of the present invention to provide a system for controlling a rear wheel steering angle using the three-degrees-of-freedom model in view of suspension steering as well as yawing and lateral displacement of a vehicle.

According to one aspect of the invention, there is provided a system for controlling a rear wheel steering angle for a vehicle which comprises a first means for sensing vehicle speed to provide a signal indicative thereof, a second means for sensing a steered angle of the steering wheel of the vehicle to provide a signal indicative thereof, a third means for determining a target steering angle for a rear wheel so as to compensate reduction of yaw damping caused by suspension steering based on the signals from the first and second means, and a fourth means for controlling an actual steering angle for the rear wheel according to the target steering angle to achieve stable cornering.

In the preferred mode, the target steering angle for the rear wheel is determined according to the following relation, $$\frac{\delta_r(S)}{\delta_f(S)} = (K + \tau_1 S + \tau_2 S^2 + \tau_3 S^3)/(1 + T_1 S + T_2 S^2 + T_3 S^3)$$

where the $\delta_f(S)$ is a value into which a front wheel steered angle is transformed according to Laplace transformation, the $\delta_r(S)$ is a value into which a rear wheel steering angle is transformed according to Laplace transformation, the K, $\tau_1$, $\tau_2$, $\tau_3$, $T_1$, $T_2$, and $T_3$ are functions relating to the vehicle speed, and the S is a Laplace operator.

Alternatively, the target steering angle for the rear wheel may be determined according to the following approximate equation, $$\frac{\delta_r(S)}{\delta_f(S)} = (K + \tau S + \tau' S^2)/(1 + TS)$$

where the $\delta_f(S)$ is a value into which a front wheel steered angle is transformed according to Laplace transformation, the $\delta_r(S)$ is a value into which a rear wheel steering angle is transformed according to Laplace transformation, the K, $\tau$, and $\tau'$ are functions relating to the vehicle speed, the S is a Laplace operator, and the T is a constant of a first order lag time of the system.

DESCRIPTION OF THE PREFERRED EMBODIMENT

Figure 1:
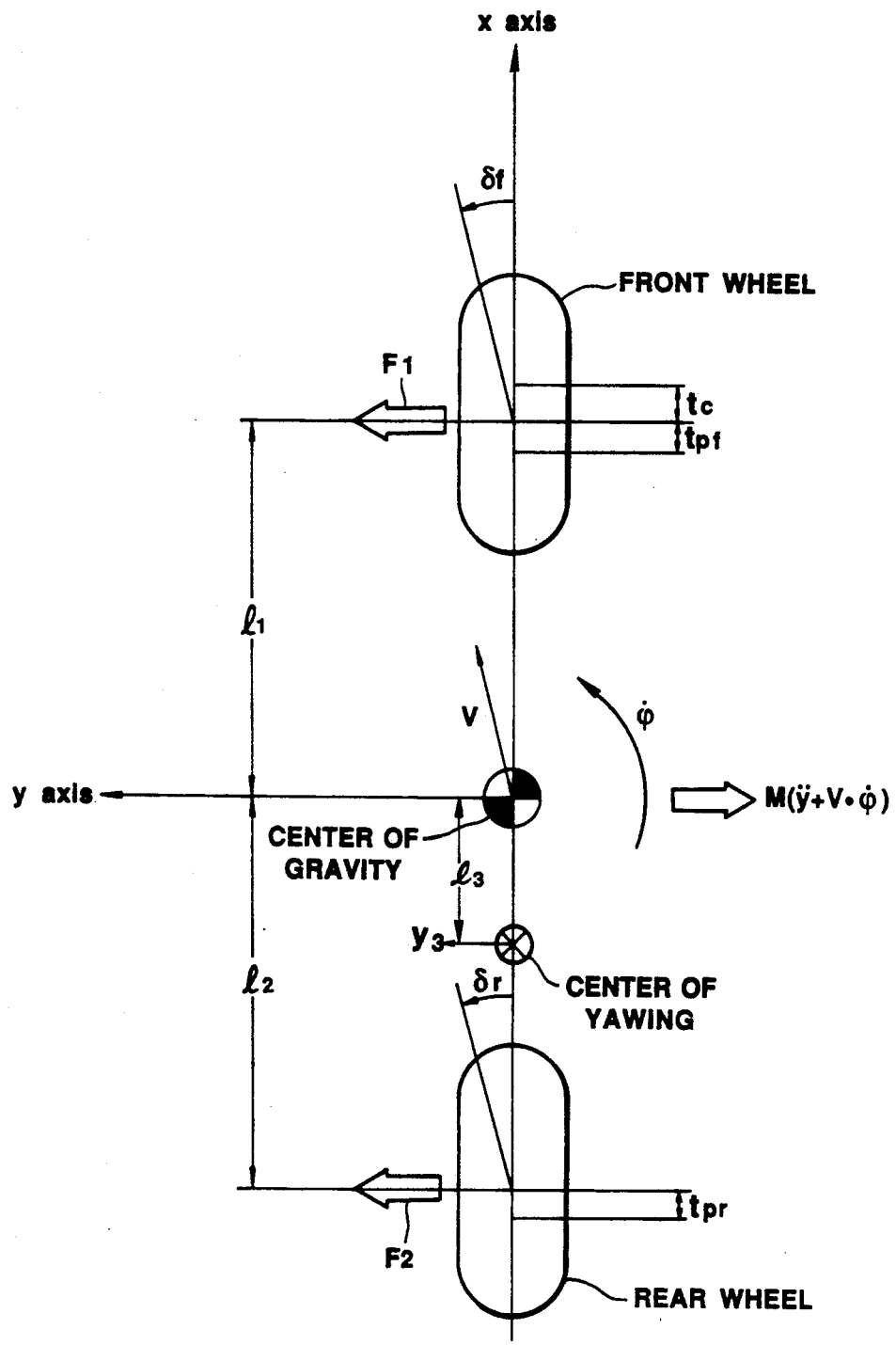
FIG. 1 is an explanatory view for deriving an equation of motion which shows a two-wheeled vehicle.

Referring now to the drawings, particularly to FIG. 1, the fundamental formulas required for designing a rear wheel steering angle control system according to the present invention will be first described hereinbelow.

For the sake of simplicity, the following representation is limited to a two-wheeled vehicle model shown in X-Y coordinates. Reference letters used below are as follows:

M: vehicle weight
$I_1$: a yawing moment of inertia
$I_2$: a rolling moment of inertia $l_1$: a distance between the center of gravity and the center point of a front axle $l_2$: a distance between the center of gravity and the center point of a rear axle $l_3$: a distance between the center of gravity and the center of yawing $t_c$: a caster-trail $t_{pf}$: a pneumatic trail of front wheels $t_{pr}$: a pneumatic trail of rear wheels $t_f$: tread between front wheels $t_r$: tread between rear wheels $h_f$: road height of the rolling center between the front wheels $h_r$: road height of the rolling center between the rear wheels $h_g$: a road height of the center of gravity $h$: a distance between the center of gravity and a rolling axis $K_{\phi f}$: a rolling rigidity of front wheels $K_{\phi r}$: a rolling rigidity of rear wheels $K_{ST}$: a steering rigidity $a_f$: damping force of front wheels $a_r$: damping force of rear wheels $C_{rf}$: a roll steer coefficient of front wheels $C_{rf}$: a roll steer coefficient of rear wheels $C_{sf}$: a compliance coefficient of front wheels $C_{sr}$: a compliance coefficient of rear wheels $C_1$: total cornering power of the two front wheels $C_2$: total cornering power of the two rear wheels $\delta_f$: an actual steering angle of front wheels $\delta_r$: an actual steering angle of rear wheels $\delta_o$: a front wheel steering angle corresponding to a steered angle $\theta$ of a steering wheel (where a steering gear ratio is N, $\delta_o = \theta/N$)

$F_1$: cornering force of front wheels $F_2$: cornering force of rear wheels $V$: vehicle speed $y$: side displacement of the center of gravity $Y_3$: side displacement of the center of yawing $\psi$: a yaw angle $\phi$: a roll angle $S$: Laplace's operator $G$: a rear wheel control transfer function In the model shown in FIG. 1, the following equations are obtained.

$$M(\ddot{y} + V\dot{\phi}) = F_1 + F_2 \quad (1)$$

$$I_1\ddot{\psi} = (l_1 - t_{pf})F_1 - (l_2 + t_{pr})F_2 \quad (2)$$

$$I_2\ddot{\psi} + \frac{(t_f^2 a_f + t_r^2 a_r)}{2}\dot{\phi} + (K_{\phi f} + K_{\phi r})\phi = \quad (3)$$

$$\{h_g - (h_f l_2 + h_r l_1)/(l_1 + l_2)\}(F_1 + F_2)$$

The cornering forces $F_1$ and $F_2$ are presented by the following equations.

$$F_1 = C_1\{\delta_f - (\dot{y} + l_1\dot{\phi})/V\}$$

$$F_2 = C_2\{\delta_r - (\dot{y} - l_2\dot{\phi})/V\}$$

In the rear wheel steering angle control system of the invention, the three-degrees-of-freedom steering model is used wherein suspension-steer is considered in addition to parameters of yawing and lateral displacement of a vehicle. Thus, the actual front wheel steering angle $\delta_f$ and the actual rear wheel steering angle $\delta_r$ are expressed as:

$$\delta_f = \theta/N - \{(t_c + t_{pf})/K_{ST}\}F_1 + C_{Rf}(t_f/2)\phi + C_{sf}(F_1/2)$$

$$\delta_r = \delta_a + C_{Rr}(t_r/2)\phi + C_{sr}(F_2/2)$$

Where $\{(t_c + t_{pf})/K_{ST}\}F_1$ conforms to a steering rigidity of a front wheel, $C_{Rf}(t_f/2)\phi$ and $C_{Rr}(t_r/2)\phi$ conform to the roll-steering of front and rear wheels respectively, $C_{sf}(F_1/2)$ and $C_{sr}(F_2/2)$ conform to the compliance-steering of front and rear wheels respectively, and $\delta_a$ conforms to a rear wheel steering operation angle. If rear wheel steering is controlled so that the degree of lateral displacement velocity of the yaw center is set to zero, the following operational relation is obtained.

$$\dot{y}_3 = \dot{y} - l_3\dot{\phi} = 0$$

thus, $$\dot{y} = l_3\dot{\phi} \quad (4)$$

By using the following letters in order to facilitate the above equations, we rewrite the equations as:

$$a' = l_1 - t_{pf} \quad C_{R1} = C_{Rf}\frac{t_f}{2}$$

$$b' = l_2 + t_{pr} \quad C_{R2} = C_{Rr}\frac{t_r}{2}$$

$$\xi' = \frac{t_f^2 a_f + t_r^2 a_r}{2} \quad C_{s1} = \frac{C_{sf}}{2}$$

$$K_1 = K_{\phi f} + K_{\phi r} \quad C_{sr} = \frac{C_{sr}}{2}$$

$$h = h_g - \frac{h_f l_2 + h_r l_1}{l_1 + l_2} \quad \frac{\theta}{N} = \delta_0$$

$$k_2 = \frac{t_c + t_{pf}}{K_{ST}}$$

By substituting the above equations regarding an actual steering angle for the equations of cornering force and arranging them according to Laplace transformation, the following equations are obtained.

$$F_1 = C_1'\left(\delta_0 + C_{R1}\phi - \frac{\dot{y} + l_1\dot{\psi}}{V}\right)$$

$$F_2 = C_2'\left(\delta_a + C_{R2}\phi - \frac{\dot{y} - l_2\dot{\psi}}{V}\right) \text{ where}$$

$$C_1' = \frac{C_1}{1 + C_1(K_2 - C_{s1})} \text{ and}$$

$$C_2' = \frac{C_2}{1 - c_2 c_{s2}}$$

By substituting the equation (4) for the equations (1) to (3), we obtain equations as follow:

$$\left\{M(l_3 S + V) + \frac{C_1'(a + l_3) + C_2'(l_3 - b)}{V}\right\}\dot{\psi} - \quad (1)'$$

$$(C_1' C_{R1} + C_2' C_{R2})\phi = (C_1' + C_2' G)\delta_0$$

-continued $$\left\{ I_1 S + \frac{aC_1'(a + l_3) - bC_2'(l_3 - b)}{V} \right\} \dot{\psi} + \qquad (2)'$$

$$(bC_2'C_{R2} - aC_1'C_{R1})\phi = (aC_1' - bC_2'G)\delta_0$$

$$\dot{\psi} = \frac{I_2 S^2 + \xi S + K_1}{Mh(l_3 S + V)} \phi \qquad (3)'$$

It is convenient to use the signs $\alpha_1, \beta_1, \epsilon_1,$ and $\eta_1,$ as follows:

$$\alpha_1 = c_1'(a+k_3) + c_2'(k_3-b)$$

$$\beta_1 = ac_1'(a+k_3) - bc_2'(k_3-b)$$

$$\epsilon_1 = C_1'C_{R1} + C_2'C_{R2}$$

$$\eta_1 = bC_2'C_{R2} - aC_1'C_{R1}$$

and by arranging the equations (1)' and (2)' to determinant, we obtain the following:

$$\begin{pmatrix} Ml_3 S + MV + \frac{\alpha_1}{V} & -\epsilon_1 \\ I_1 S + \frac{\beta_1}{V} & \eta_1 \end{pmatrix} - \begin{pmatrix} \dot{\psi} \\ \phi \end{pmatrix} = \begin{pmatrix} C_1' + C_2'G \\ aC_1' - bC_2'G \end{pmatrix} \delta_0$$

By solving the above equation for $$\begin{pmatrix} \dot{\psi} \\ \phi \end{pmatrix},$$

it is expressed as follows:

$$\begin{pmatrix} \dot{\psi} \\ \phi \end{pmatrix} =$$

$$\frac{1}{\Delta} \begin{pmatrix} \eta_1 & \epsilon_1 \\ -I_1 S - \frac{\beta_1}{V} & Ml_3 S + MV + \frac{\alpha_1}{V} \end{pmatrix} \begin{pmatrix} C_1' + C_3'G \\ aC_1' - bC_2'G \end{pmatrix} \delta_0$$

where $$\Delta = \eta_1 \left( Ml_3 S + MV + \frac{\alpha_1}{V} \right) + \epsilon_1 \left( I_1 S + \frac{\beta_1}{V} \right).$$

By expanding the above equation, we obtain as follows:

$$\Delta \frac{\dot{\psi}}{\delta_0} = \eta_1(C_1' + C_2'G) + \epsilon_1(aC_1' - bC_2'G) =$$

$$C_1'(\eta_1 + a\epsilon_1) + C_2'(\eta_1 - b\epsilon_1)G$$

$$\Delta \frac{\phi}{\delta_0} = -\left( I_1 S + \frac{\beta_1}{V} \right)(C_1' + C_2'G) +$$

$$\left( Ml_3 S + MV + \frac{\alpha_1}{V} \right)(aC_1' - bC_2'G) -$$

-continued $$\left( MV + \frac{\alpha_1}{V} \right) aC_1' - \frac{\beta_1 C_1'}{V} + (aC_1'Ml_3 - I_1C_1')S -$$

$$\left[ \left\{ \left( MV + \frac{\alpha_1}{V} \right) bC_2' + \frac{\beta_1 C_2'}{V} \right\} + (bC_2'Ml_3 + I_1C_2')S \right] G$$

$$(I_2 S^2 + \xi S + K_R)\phi = hM(l_3 S + V)\dot{\psi}$$

By using the following letters to simplify the equations, $$P_0' = MV + \frac{\alpha_1}{V} \quad I_2' = \frac{I_2}{h}$$

$$P_1' = C_1'(\eta_1 + a\epsilon_1) \quad Q' = \frac{\xi}{h}$$

$$P_2' = C_2'(\eta_1 + b\epsilon_1) \quad k_r' = \frac{K_R}{h}$$

$$P_3' = P_0'aC_1' = \frac{\beta_1 C_1}{V}$$

$$P_4' = aC_1'Nl_3 - I_1C_1'$$

$$P_5' = P_0'bC_2' + \frac{\beta_1 C_2'}{V}$$

$$P_6' = bC_2'Ml_3 - I_1C_2'$$

they may be rewritten as follows:

$$\Delta \frac{\dot{\psi}}{\delta_0} = P_1' + P_2'G \qquad (5)$$

$$\Delta \frac{\phi}{\delta_0} = P_3' + P_4'S - (P_5' + P_6'S)G \qquad (6)$$

$$(I_2'S^2 + Q'S + K_R')\phi = M(l_3 S + V)G \qquad (7)$$

By substituting the equations (5) and (6) for the equation (7) and solving it for the G, the transfer function $\delta_r/\delta_f = G$ for controlling a rear wheel steering angle is yielded as follows:

$$(I_2'S^2 + Q'S + K_R')\{(P_3' + P_4'S) = (P_5' + P_6'S)G\} =$$

$$(Ml_3 S + MV)(P_1' + P_2'G)$$

$$(I_2'S^2 + Q'S + K_R')(P_3' + P_4'S) - (Ml_3 S + MV)P_1' =$$

$$\{(I_2'S^2 + Q'S + K_R')(P_5' + P_6'S) + (Ml_3 S + MV)P_2'\}G$$

thus, $$G = (d_{00} + d_{01}S + d_{02}S^2 + d_{03}S^3)/(e_{00} + e_{01}S + e_{02}S^2 + e_{03}S^3)$$

where
$d_{00} = K_R'P_3' - MVP_1'$
$d_{01} = K_r'P_4' + Q'P_3' - Ml_3P_1'$
$d_{02} = Q'P_4' + I_2'P_3'$
$d_{03} = I_2'P_4'$
$e_{00} = K_R'P_5' + P_2'MV$
$e_{01} = K_r'P_6' + Q'P_5' + P_2'Ml_3$
$e_{02} = Q'P_6' + I_2'P_5'$
$e_{03} = I_2'P_6'$ In order to simplify the equation, letters are used as follows, $$K = d_{00}/e_{00} \quad T_1 = e_{01}/e_{00}$$

$$\tau_1 = d_{01}/e_{00} \quad T_2 = e_{02}/e_{00}$$

-continued $$\tau_2 = d_{02}/e_{00} \quad T_3 = e_{03}/e_{00}$$

$$\tau_3 = d_{03}/e_{00}$$

and, the transfer function G is rewritten as follows:

$$G = (K + \tau_1 S + \tau_2 S^2 + \tau_3 S^3)/(1 + T_1 S + T_2 S^2 + T_3 S^3) \quad (8)$$

It will be appreciated that the $\epsilon_1$ and the $\eta_1$ are terms each of which is multiplied by the roll-steer coefficient and thus the roll-steer refers to all terms of the K, the $\tau_1$ to $\tau_3$, the $T_1$ to $T_3$. This results in a rear wheel steering angle determined in view of suspension steering, which satisfies the transfer function G given by a fractional expression of, a third order expression/a third order expression. Therefore, improvement in yaw damping due to rear wheel steering operations in high frequency steering ranges can be maintained without degradation by suspension steering.

Figure 2:
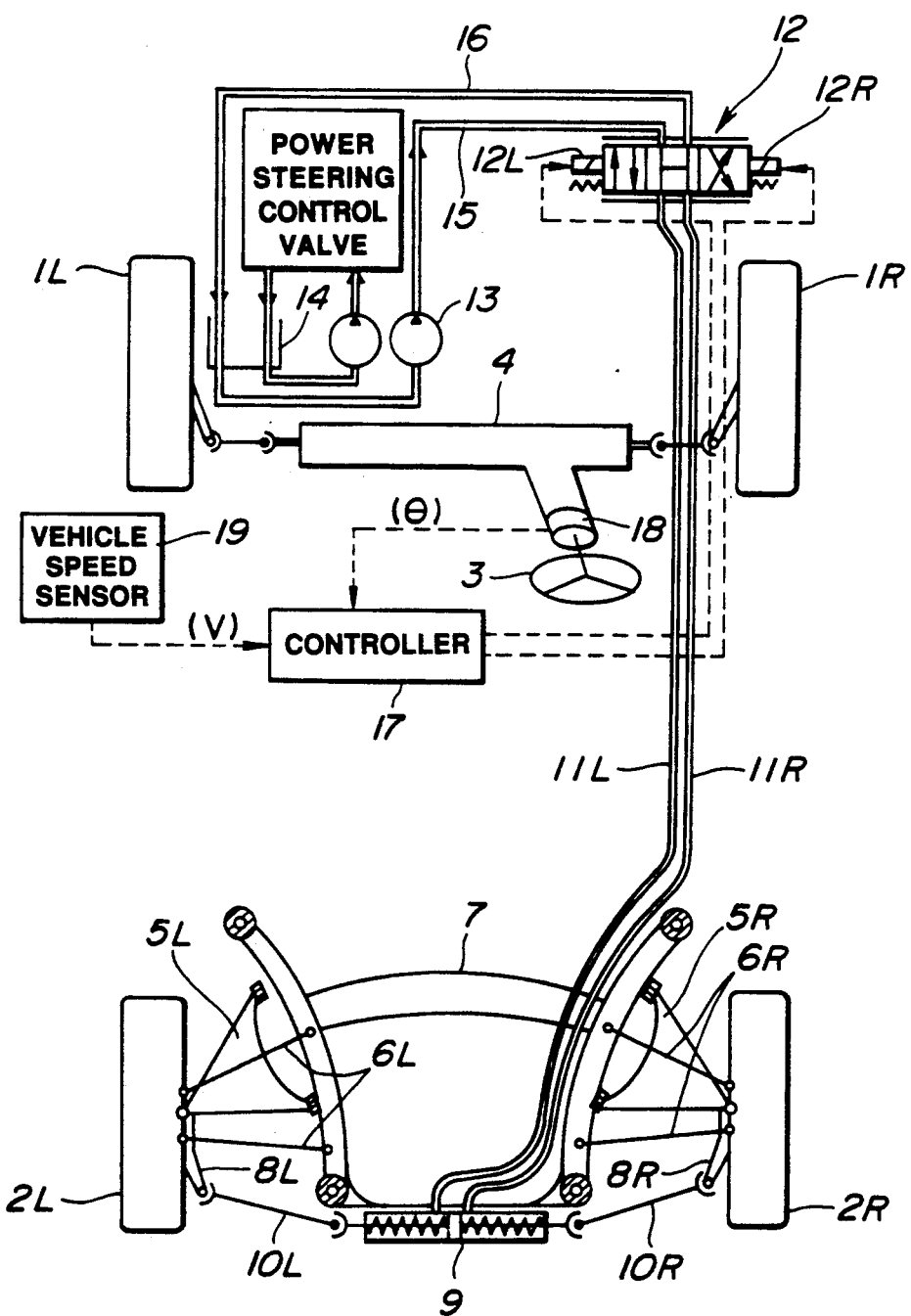
FIG. 2 is a schematic view which shows a system for controlling a rear wheel steering angle of a vehicle according to the present invention.

Referring to FIG. 2, a system is shown which is adapted for controlling a steering angle for the rear wheels of a vehicle according to the instant invention.

Front wheels 1L (left) and 1R (right) are rotatably connected to a steering wheel 3 via a steering gear 4. The rotation of the steering wheel 4 by an angle $\theta$ causes the front wheels to rotate by an angle $\delta_f$. If a steering gear ratio is a N, the relation between the $\theta$ and the $\delta_f$ is expressed by $\delta_f = \theta/N$. Rear wheels 2L and 2R are suspended by a rear suspension member 7 of a rear suspension system including transverse links 5L and 5R and upper arms 6L and 5R. An actuator 9 is provided which is connected between rear knuckle arms 8L and 8R through side rods 10L and 10R to steer the rear wheels 2L and 2R.

The actuator 9 is a spring centered double acting hydraulic pressure cylinder, which has two chambers each connected to an electromagnetic proportional pressure control valve 12 through pressure lines 11L and 11R. The control valve 12 is connected to a pressure source including a hydraulic pump 12 and a reservoir tank 14 through a pressure line 15 and a drain line 16. This control valve 12 is a spring centered three position valve which is adapted to provide no pressure in the pressure line 11L and 11R when both solenoids 12L and 12R are in the OFF state and to apply working pressure to the pressure line 11R which is proportional to a period of time during which the solenoid 12R is energized.

Figure 3:
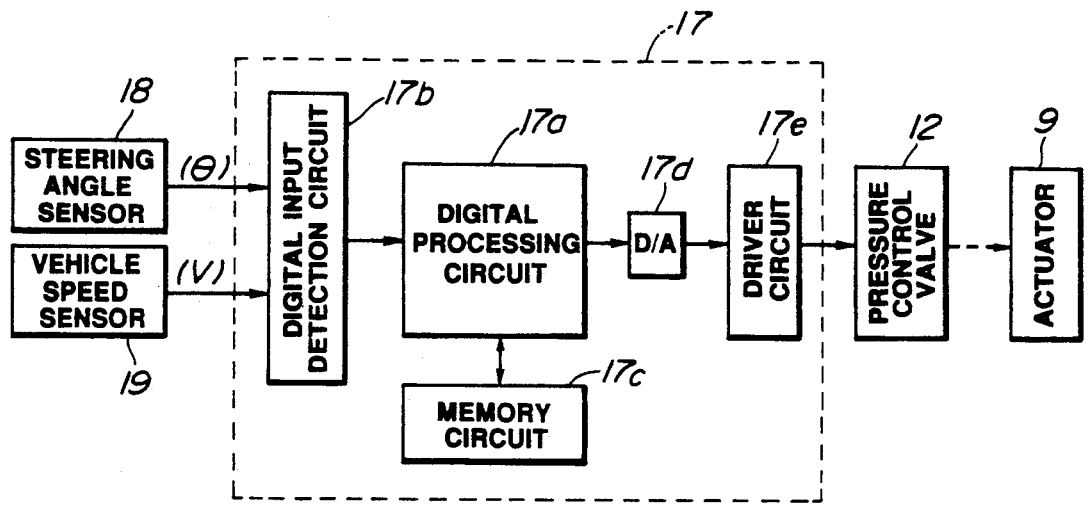
FIG. 3 is a block diagram which shows a rear wheel steering angle control system according to the invention.

A controller 17 is provided which electronically controls the switching operation and the energized time of the solenoids 12L and 12R. This controller 17, as shown in FIG. 3, generally comprises a digital arithmetic circuit 17a, a digital input signal detecting circuit 17b, a memory circuit 17c, a D/A converter 17d, and a drive circuit 17e. A steering angle sensor 18 and a vehicle speed sensor 19 are further provided. The steering angle sensor is adapted for sensing the steered angle $\theta$ of the steering wheel 3 to provide a digital signal to the digital input detecting circuit 17b. The vehicle speed sensor 19 is adapted to sense vehicle speed V to provide a digital signal to the circuit 17b. Based on these input information signals, the digital arithmetic circuit 17a determines a rear wheel steering angle in the following manner.

Figure 4:
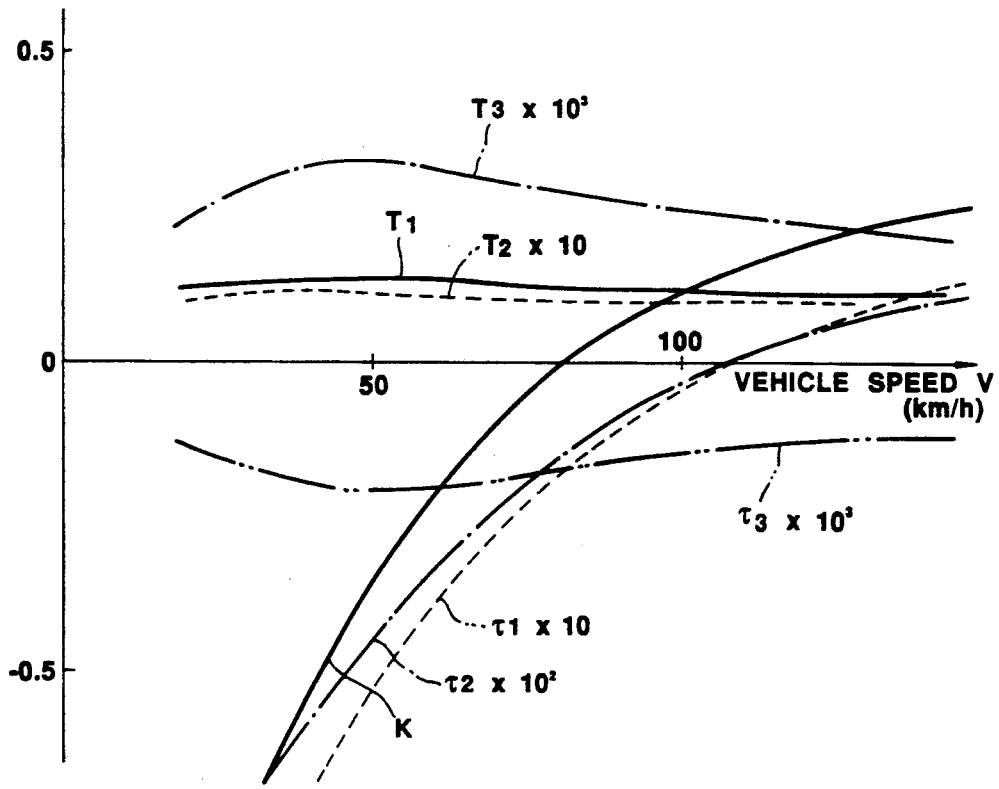
FIG. 4 is a graph which shows control constants of a transfer function.

From a data table stroing data as shown in FIG. 4, control constants K, $\tau_1$ to $\tau_3$, and $T_1$ to $T_3$ corresponding to a vehicle speed V are looked up to calculate the transfer function G according to the equation (8) based on them. Subsequently, a front wheel steering angle $\delta_f = \theta/N$ corresponding to the detected actual steered angle $\theta$ is determined. A target rear wheel steering angle $\delta_r = \delta_f G$ is calculated by multiplying the front wheel steering angle $\delta_f$ by the transfer function G to provide digital signals corresponding to the result to the D/A converter 17d, in which these digital signals are then converted into an analog signal. The drive circuit 17e converts the analog signal to current i corresponding to the target rear wheel steering angle $\delta_r$ to output it to the control valve 12 for controlling the working pressure to steer the rear wheels.

At this time, the controller 17 selectively determines as to whether the current i has to be supplied to the solenoids 12L and 12R of the control valve based on the steered angle $\theta$ to provide a working pressure which corresponds to the current i (e.i., a calculated rear wheel steering angle $\delta_r^-$) to the corresponding pressure lines 11L and 11R. This causes actuator 9 to be operated so as to allow the side rods 10L and 10R to be moved by a stroke corresponding to the pressure, steering the rear wheel by an angle corresponding to the mathematically calculated result.

Figure 5A:
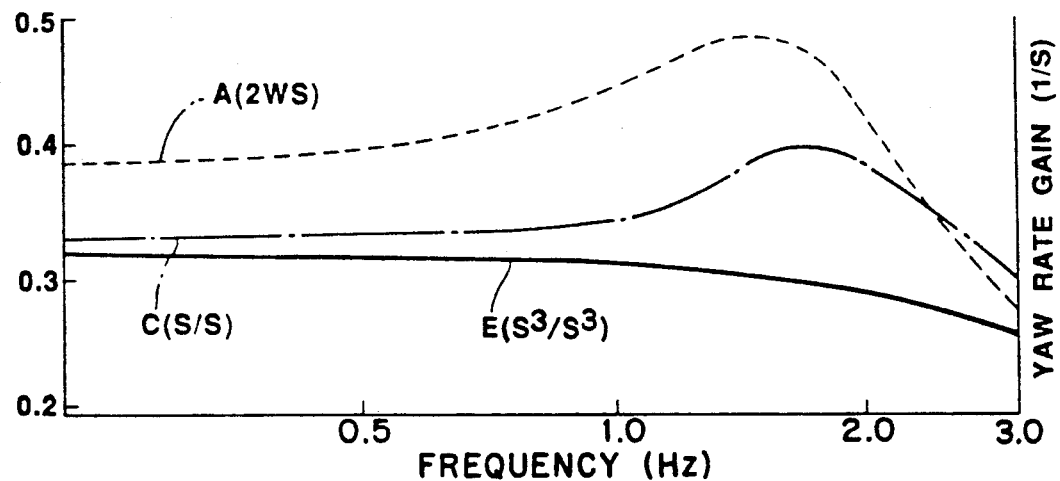
FIG. 5A and FIG. 5B are graphs which show, respectively, yaw rate gain and phase angle properties caused by a rear wheel steering control according to the invention and those of a 2WS vehicle and prior art rear wheel steering angle control.
Figure 5B:
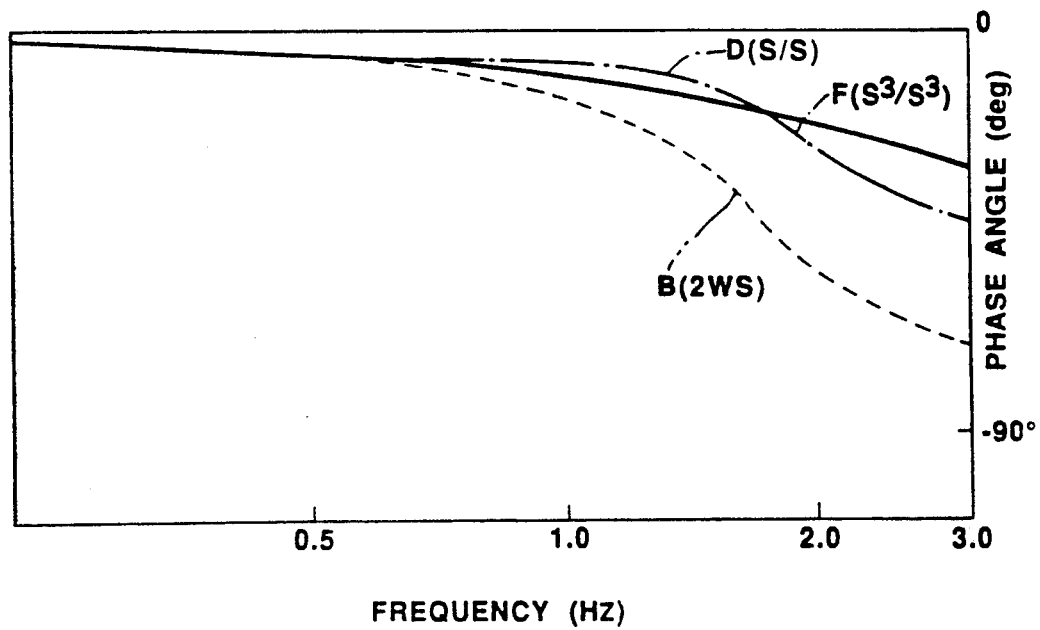

As is clear from the above, because the equation (8) is the transfer function in the form of a third order expression/a third order expression including a suspension steer parameter as well as yaw and lateral displacement parameters, the mathematically calculated target rear wheel steering angle $\delta_r$ pre-includes an angle taking account of suspension steering. It will be appreciated that such rear wheel steering control prevents increase in the rear wheel steering angle from being reduced by suspension steering. Yaw rate gain and phase angle characteristics are given by curves E and F in FIG. 5A and 5B, respectively. Variation in the yaw rate gain and phase delay are maintained to be reduced even within a high steering frequency.

However, the rear wheel control system as described above requires a high speed calculating computer and a digital filter for example, resulting in a high cost and complex control circuit. Accordingly, in order to reduce the manufacturing cost and to simplify the control circuit, an approximate expression of the transfer function may be obtained in a manner described hereinbelow to control the rear wheel steering angle.

A hydraulic system for steering the rear wheels tends generally to provide a first order lag time. If a first order lag time constant is T, a hydraulic lag in the rear wheel steering control is expressed by $1/(1+TS)$. Accordingly, the above equation (8) may be multiplied by $(1+TS)$ to approximately determine the transfer function G of the mathematically calculated rear wheel steering target angle $\delta_r$ relative to the actual front wheel steered angle $\delta_f$ so as to compensate the hydraulic lag. We therefore obtain the following equation.

$$G = \frac{\delta_r}{\delta_f}$$

$$= \frac{K + \tau_1 S + \tau_2 S^2 + \tau_3 S^3}{1 + T_1 S + T_2 S^2 + T_3 S^2} (1 + TS)$$

Assuming that a value of the terms S is extremely small in the above equation, it can be rewritten as follows:

$$\frac{\dot{\delta}_r}{\delta_f} \approx (K + \tau_1 S + \tau_2 S^2 + \tau_3 S^3)(1 + TS) \times$$

$$\{1 - (T_1 S + T_2 S^2 + T_3 S^3) + (T_1 S +$$

$$T_2 S^2 + T_3 S^3)^2 - (T_1 S + T_2 S^2 + T_3 S^3)^3 \ldots \}$$

The above equation can be further rewritten as follows:

$$\frac{\dot{\delta}_r}{\delta_f} \approx K + \{\tau_1 + K(T - T_1 \times)\}S +$$

$$\{\tau_2 + \tau_1(T - T_1) - K(T_2 - T^2{}_2 + T_1 T)\}S^2$$

In the above equation, if each the $\{\tau_1 + K(T-T_1)\}S$ and $\{\tau_2 + \tau_1(T-T_1) - K(T_2 - T^2{}_2 + T_1T)\}$ is replaced by a $\tau$ and a $\tau'$ for the sake of simplicity, the following equation obtains which is the relation between the actual front wheel steered angle $\delta_f$ and the target rear wheel steered angle $\dot{\delta}_r$.

$$\frac{\dot{\delta}_r}{\delta_f} \approx K + \tau S + \tau' S^2$$

Thus, the relation between the actual front wheel steered angle $\delta_f$ and the actual rear wheel steered angle $\delta_r$ is expressed as follows due to hydraulic lag.

$$\frac{\delta_r}{\delta_f} \approx \frac{K + \tau S + \tau' S^2}{1 + TS}$$

The rear wheel steering angle control in view of hydraulic lag has been disclosed in U.S. patent application Ser. No. 419,161 filed on Oct. 10, 1989, entitled "REAR WHEEL STEERING ANGLE CONTROL SYSTEM FOR VEHICLE" by Kazunori MORI et al., assigned to NISSAN MOTOR CO., LTD, now U.S. Pat. No. 5,105,899, the disclosure of which is incorporated herein by reference.

Figure 6:
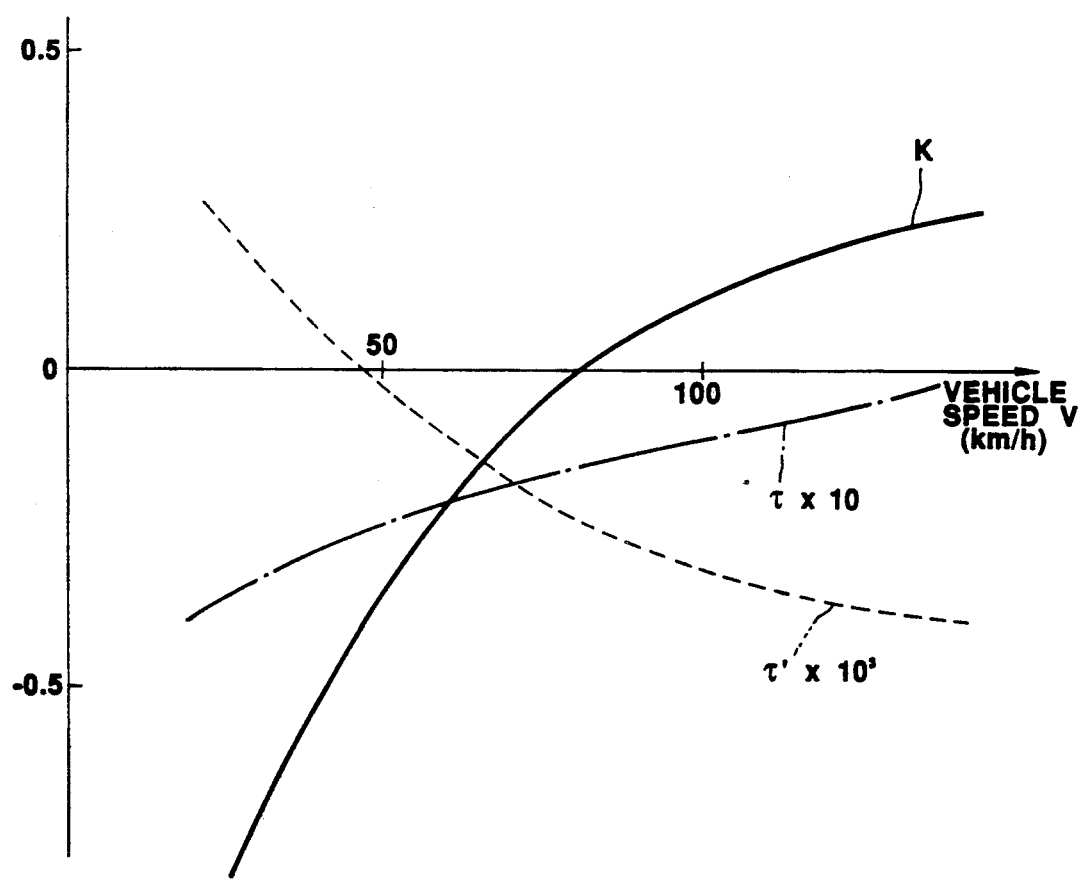
FIG. 6 is a graph which shows control constants of an approximate equation of a transfer function.
Figure 7:
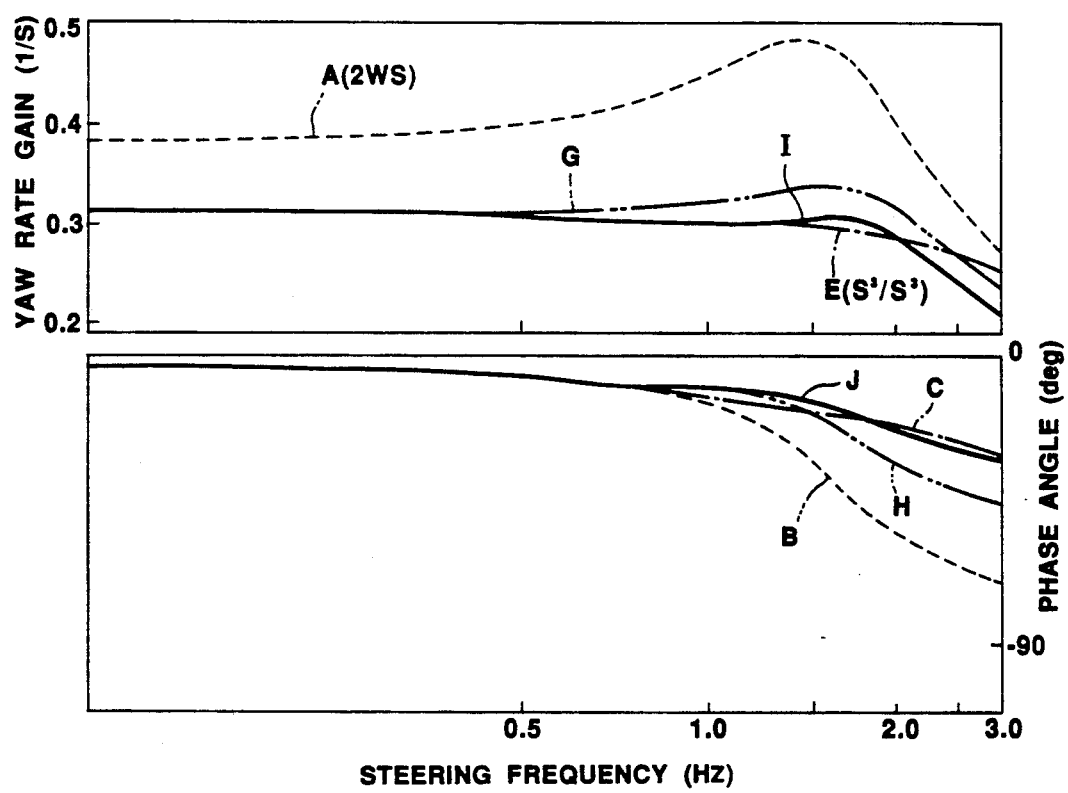
FIG. 7 is a graph which shows yaw rate gain and phase angle properties caused by a rear wheel steering angle control effected according to an approximate equation of a transfer function.
Figure 8:
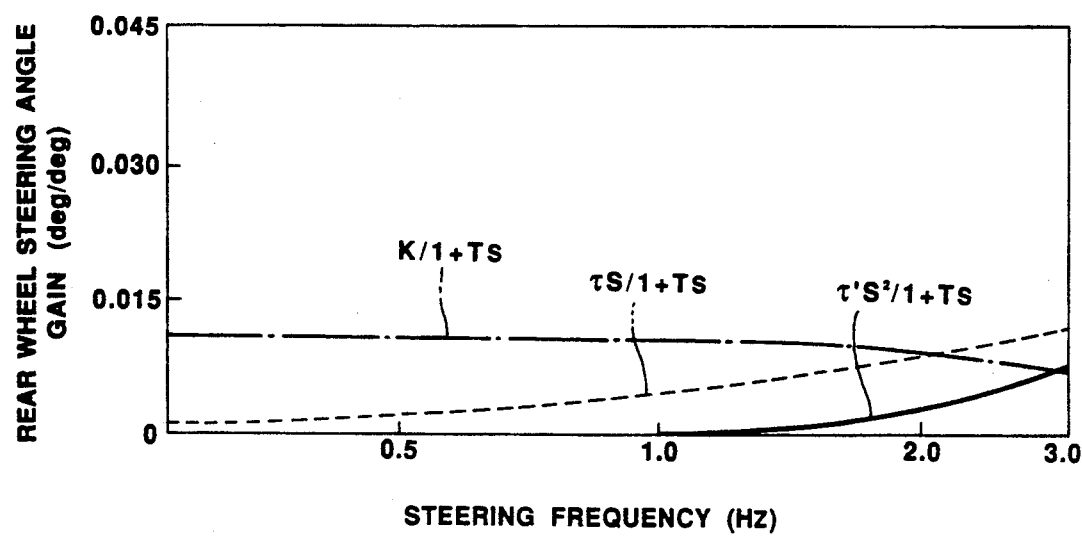
FIG. 8 shows rear wheel steering angle increase of each term of an approximate equation of a transfer function.

FIG. 6 shows control constants K, $\tau$, and $\tau'$ of the above approximate equation. The manner in which rear wheel steering control is effected using the above approximate equation based on such control parameters as yaw rate gain and phase angle characteristics are shown by curves G and H in FIG. 7 respectively wherein like numbers refer to like characteristics. Because terms of a higher order of Laplace's operator S have been omitted in calculation of the approximate equation, errors between logical characteristics C and E and actual characteristics G and H increase in high frequency steering ranges.

FIG. 6 shows rear wheel steering gains caused by the terms $K/(1+TS)$, $\tau S/(1+TS)$, and $\tau' S^2/(1+TS)$ of the approximate equation. It will be noted that the gain of the term of $\tau'$ increases only the range of high steering frequency. Therefore, the great absolute value of the term of $\tau'$ can compensate the shifting between the logical value and the actual value effectively. For example, if the absolute value of $\tau'$ is increased by two and half times as that shown in FIG. 6, the yaw rate gain and the phase angle characteristics are changed from curves indicated by G and H to curves I and J in FIG. 7, resulting in greatly improved accuracy of approximation relative to the logical characteristics C and E.

What is claimed is:

1. A system for controlling a rear wheel steering angle for a vehicle comprising:

first means for sensing vehicle speed to provide a signal indicative thereof;

second means for sensing a steered angle of a steering wheel of the vehicle to provide a signal indicative thereof;

third means for performing a suspension steering control operation on a rear wheel which reduces yaw damping of the vehicle;

fourth means for determining a target steering angle for the rear wheel so as to compensate for reduction of the yaw damping of the vehicle, caused by the suspension steering control of the rear wheel, based on the signals from said first and second means; and fifth means for performing a yaw damping control operation by controlling an actual steering angle for the rear wheel according to the target steering angle for the rear wheel determined by said fourth means to achieve stable cornering.

2. A system as set forth in claim 1, wherein said fourth means determines a front wheel actual steered angle of the front wheel based on the signal from said first means to provide a signal indicative thereof, said fourth means further determining a steered angle component of the rear wheel caused by the suspension steering control of the rear wheel to determine a target steering angle for determining an actual steered angle of the rear wheel including the steered angle component of the rear wheel so that the degree of lateral displacement velocity of a yaw center of the vehicle, caused by steering of the front wheels by the actual steered angle, substantially becomes zero.

3. A system as set forth in claim 2, wherein said target steering angle for the rear wheel is determined according to the following relation, $$\frac{\delta_r(S)}{\delta_f(S)} = (K + \tau_1 S + \tau_2 S^2 + \tau_3 S^3)/(1 + T_1 S + T_2 S^2 + T_3 S^3)$$

where the $\delta_f(S)$ is a value into which a front wheel steered angle is transformed according to a Laplace transformation, the $\delta_r(S)$ is a value into which a rear wheel steering angle is transformed according to a Laplace transformation, the K, $\tau_1$, $\tau_2$, $\tau_3$, $T_1$, $T_2$, and $T_3$ are functions relating to the vehicle speed, and the S is a Laplace operator.

4. A system as set forth in claim 2, wherein said target steering angle for the rear wheel is determined according to the following approximate equation, $$\frac{\delta_r(S)}{\delta_f(S)} = (K + \tau S + \tau' S^2)/(1 + TS)$$

where the $\delta_f(S)$ is a value into which a front wheel steered angle is transformed according to a Laplace transformation, the $\delta_r(S)$ is a value into which a rear wheel steering angle is transformed according to a Laplace transformation, the K, $\tau$, and $\tau'$ are functions relating to the vehicle speed, the S is a Laplace operator, and the T is a constant of a first order lag time of the system.

5. An apparatus for controlling a rear wheel steering angle for a vehicle comprising:

first means for sensing vehicle speed to provide a signal indicative thereof;

second means for sensing a steered angle of a steering wheel of the vehicle to provide a signal indicative thereof;

third means for determining a target steering angle for rear wheels so as to satisfy the following equation based on the signals from said first and said second means; and fourth means for steering the rear wheels according to the target steering angle determined by said third means, thereby performing a yaw damping control operation and improving yaw damping of the vehicle during vehicle cornering, $$\frac{\delta_r(S)}{\delta_f(S)} = (K + \tau_1 S + \tau_2 S^2 + \tau_3 S^3)/(1 + T_1 S + T_2 S^2 + T_3 S^3)$$

where the $\delta_f(S)$ is a value into which a front wheel steered angle is transformed according to a Laplace transformation, the $\delta_r(S)$ is a value into which a rear wheel steering angle is transformed according to a Laplace transformation, the K, $\tau_1$, $\tau_2$, $\tau_3$, $T_1$, $T_2$, and $T_3$ are functions relating to the vehicle speed, and the S is a Laplace operator.

6. A system as set forth in claim 5, wherein said target steering angle for the rear wheels is determined according to the following approximate equation, $$\frac{\delta_r(S)}{\delta_f(S)} = (K + \tau S + \tau' S^2)/(1 + TS)$$

where the $\delta_f(S)$ is a value into which a front wheel steered angle is transformed according to a Laplace transformation, the $\delta_r(S)$ is a value into which a rear wheel steering angle is transformed according to a Laplace transformation, the K, $\tau$, and $\tau'$ are functions relating to the vehicle speed, the S is a Laplace operator, and the T is a constant of a first order lag time of the system.

7. A system for controlling a rear wheel steering angle for a vehicle comprising:

first means for sensing vehicle speed to provide a signal indicative thereof;

second means for performing a suspension steering control operation on the front wheels and for performing a suspension steering control operation on the rear wheels, the suspension steering control operation on the front wheels including roll and compliance steering;

third means for sensing a steered angle of a steering wheel of the vehicle to determine an actual steered angle of front wheels which include a steered angle component of the front wheels, caused by the suspension steering control of the front wheels, based on the signal from said first means, and for providing a signal indicative thereof;

fourth means for determining a steered angle component of the rear wheels caused by the suspension steering control of the rear wheels when the rear wheels are steered so that a degree of lateral displacement velocity of a yaw center of the vehicle, caused by steering of the front wheels by the actual steered angle of the steering wheel determined by said third means, substantially becomes zero to project an actual steered angle of the rear wheels, said fourth means determining a target steering angle for the rear wheels so as to provide the projected actual steered angle of the rear wheels and providing a signal indicative thereof; and fifth means, responsive to the signal from said fourth means, for steering the rear wheels according to the target steering angle.

8. A system as set forth in claim 7, wherein said target steering angle for the rear wheel is determined according to the following relation, $$\frac{\delta_r(S)}{\delta_f(S)} = (K + \tau_1 S + \tau_2 S^2 + \tau_3 S^3)/(1 + T_1 S + T_2 S^2 + T_3 S^3)$$

where the $\delta_f(S)$ is a value into which a front wheel steered angle is transformed according to a Laplace transformation, the $\delta_r(S)$ is a value into which a rear wheel steering angle is transformed according to a Laplace transformation, the K, $\tau_1$, $\tau_2$, $\tau_3$, $T_1$, $T_2$ and $T_3$ are functions relating to a the vehicle speed, and the S is a Laplace operator.

9. A system as set forth in claim 7, wherein said target steering angle for the rear wheel is determined according to the following approximate equation, $$\frac{\delta_r(S)}{\delta_f(S)} = (K + \tau S + \tau' S^2)/(1 + TS)$$

where the $\delta_f(S)$ is a value into which a front wheel steered angle is transformed according to a Laplace transformation, the $\delta_r(S)$ is a value into which a rear wheel steering angle is transformed according to a Laplace transformation, the K, $\tau$, and $\tau'$ are functions relating to the vehicle speed, the S is a Laplace operator, and the $\tau$ is a constant of a first order lag time of the system.

* * * * *